(12) United States Patent
Berio et al.

(10) Patent No.: US 9,179,607 B2
(45) Date of Patent: Nov. 10, 2015

(54) FENCE POST MOUNTABLE FOR DISPLAYING FLOWERS, PLANTS, AND THE LIKE

(71) Applicants: Christian Berio, West Islip, NY (US); Antonio Fischietti, West Islip, NY (US)

(72) Inventors: Christian Berio, West Islip, NY (US); Antonio Fischietti, West Islip, NY (US)

( * ) Notice: Subject to any disclaimer, the term of this patent is extended or adjusted under 35 U.S.C. 154(b) by 0 days.

(21) Appl. No.: 14/546,466

(22) Filed: Nov. 18, 2014

(65) Prior Publication Data

US 2015/0136923 A1    May 21, 2015

Related U.S. Application Data

(60) Provisional application No. 61/905,659, filed on Nov. 18, 2013.

(51) Int. Cl.
*A47B 96/06* (2006.01)
*A01G 9/02* (2006.01)
*E04H 17/20* (2006.01)

(52) U.S. Cl.
CPC . *A01G 9/02* (2013.01); *E04H 17/20* (2013.01)

(58) Field of Classification Search
CPC ............. A47G 7/04; A47G 7/00; A01G 9/02; E04H 17/20
See application file for complete search history.

(56) References Cited

U.S. PATENT DOCUMENTS

| | | | | |
|---|---|---|---|---|
| 4,722,514 | A * | 2/1988 | Pettit | 256/50 |
| 4,896,456 | A * | 1/1990 | Grant | 47/67 |
| 5,332,196 | A | 7/1994 | Wright | |
| 6,722,637 | B2 * | 4/2004 | Burkart et al. | 256/1 |
| 7,845,604 | B2 * | 12/2010 | Connor, Jr. | 248/215 |
| 8,104,734 | B2 | 1/2012 | Stover | |

* cited by examiner

*Primary Examiner* — Amy Sterling
(74) *Attorney, Agent, or Firm* — Carter, DeLuca, Farrell & Schmidt, LLP (57) ABSTRACT

An apparatus for releasable mounting to a fence post is provided. The apparatus includes a leg portion, a basket portion, and a mounting portion. The leg portion defines a first end and a second end. The basket portion is coupled to the leg portion at the first end of the leg portion and extends from the leg portion in a first direction. The mounting portion is coupled to the leg portion at the second end of the leg portion and extends from the leg portion in a second direction opposite the first direction. The mounting portion is configured for mounting about a fence post.

10 Claims, 7 Drawing Sheets

FENCE POST MOUNTABLE FOR DISPLAYING FLOWERS, PLANTS, AND THE LIKE

CROSS-REFERENCE TO RELATED APPLICATIONS

This application claims the benefit of and priority to U.S. Provisional Patent Application No. 61/905,659, filed on Nov. 18, 2013, the entire contents of which are hereby incorporated herein by reference.

BACKGROUND

1. Technical Field

The present disclosure relates to the display of flowers, plants, and the like. More particularly, the present disclosure relates to fence post mountable apparatus for displaying flowers, plants, and the like.

2. Background of Related Art

Fences are used to define land boundaries between neighbors, establish privacy from adjoining land, and/or fully or partially enclose specific areas, e.g., yards, parking lots, playgrounds, etc. Fences are typically constructed by setting a plurality of spaced-apart fence posts in the ground and mounting a fence panel between each pair of adjacent fence posts. Historically, the fence posts were made from solid wood beams and the fence panels were made from a plurality of wood slats mounted side-by-side on one or more wood support rails.

More recently, fence manufactures have turned to metals and plastics, e.g., PVC or vinyl, due to their strength, durability, and maintenance-free attributes. Such metal and plastic fences are constructed similar to their wood counterparts, that is, by setting a plurality of spaced-apart fence posts in the ground and mounting a fence panel between each pair of adjacent fence posts.

Figure 9:
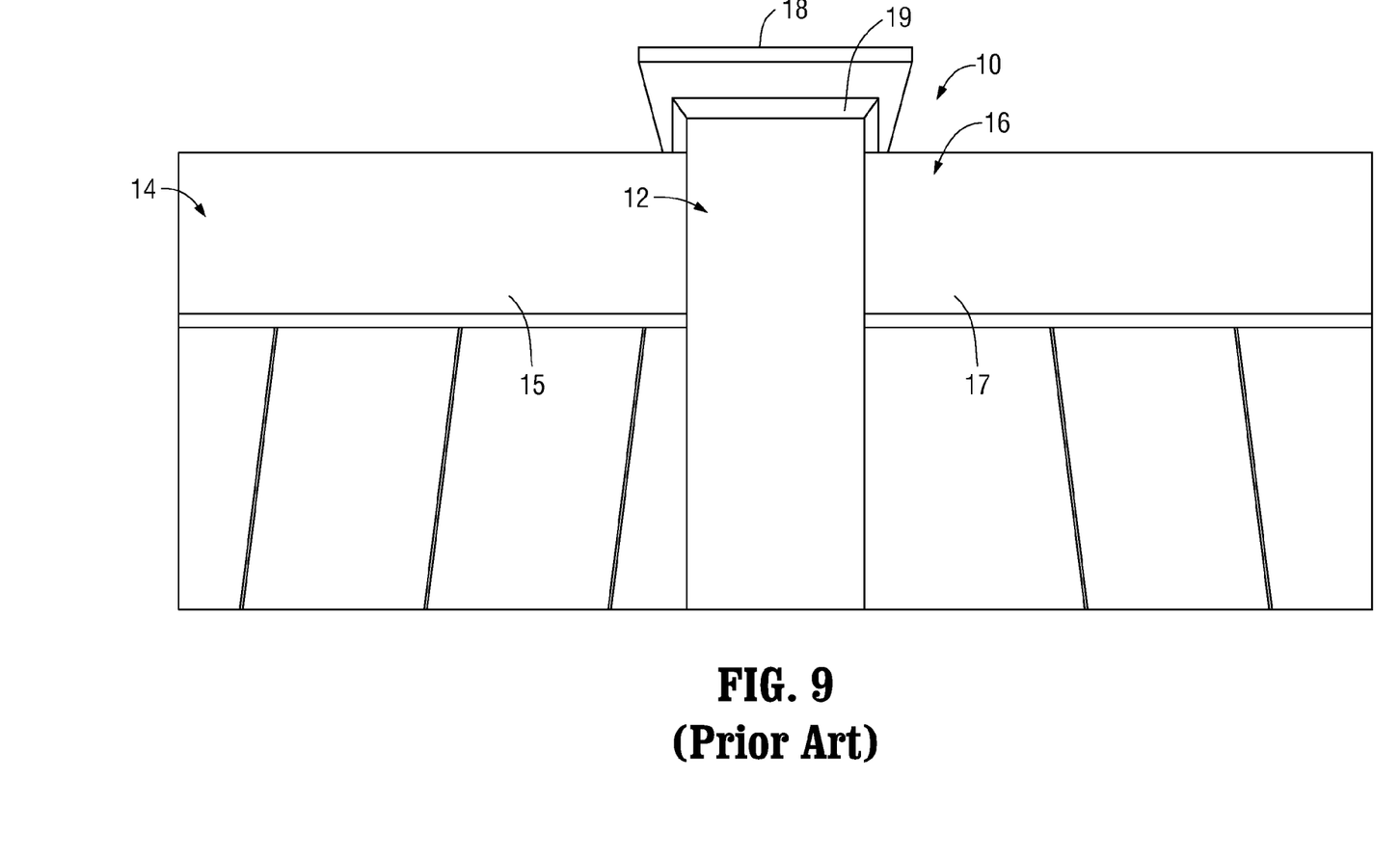
FIG. 9 is a perspective view of a typical fence including a typical post cap mounted on a fence post of the fence.
Figure 10:
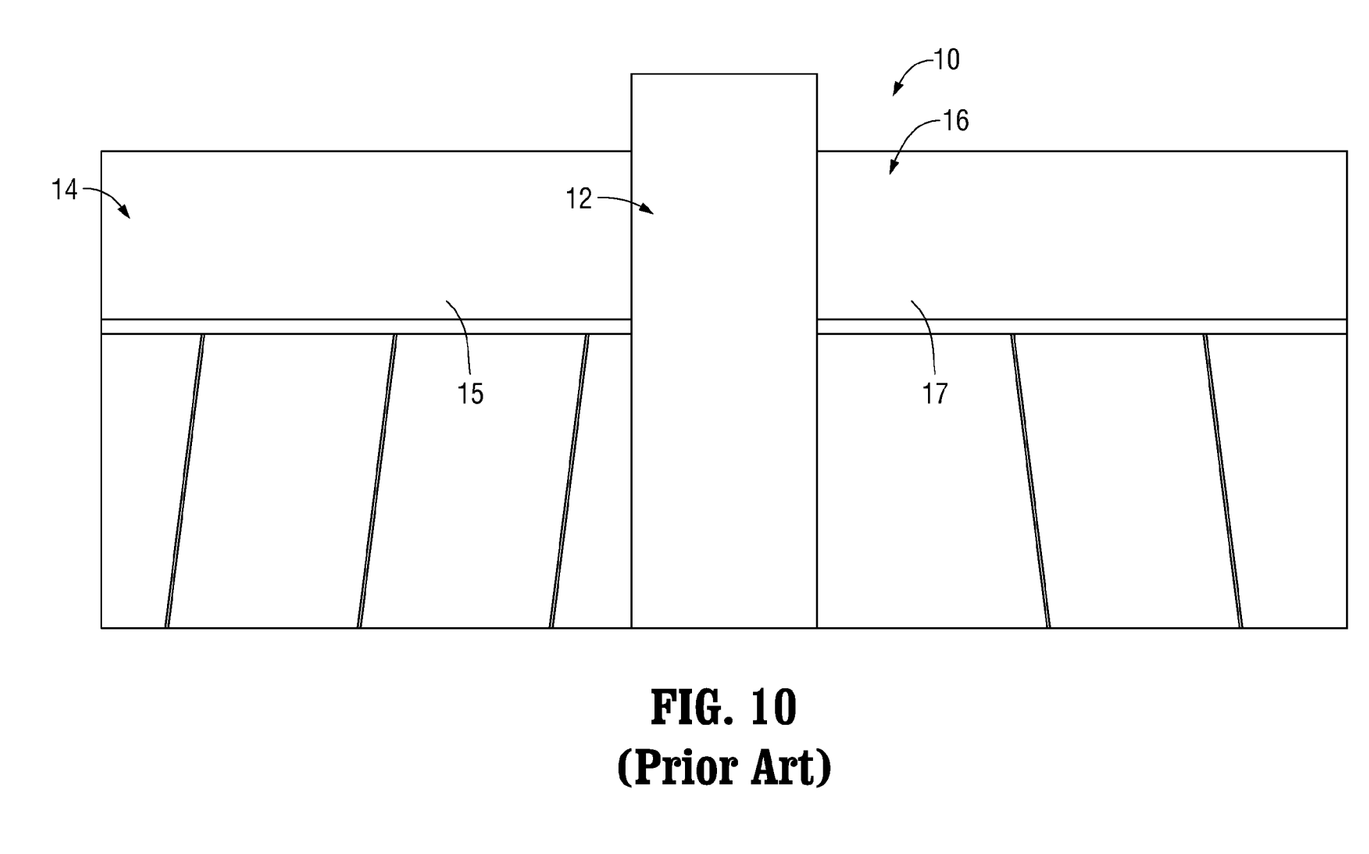
FIG. 10 is a perspective view of the fence of FIG. 9 with the post cap removed from the fence post.

A portion of a typical PVC or vinyl fence 10 is shown in FIGS. 9 and 10 including a fence post 12 interconnecting a pair of fence panels 14, 16. The fence post 12 defines a hollow interior and a generally square transverse cross-sectional configuration of standard size, e.g., 4 inches by 4 inches, although the fence post 12 may come in one or more different standard sizes. A post cap 18 is configured for positioning about the open end of the fence post 12 to seal off the hollow interior. More specifically, post cap 18 includes a hollow base 19 that is complementary to and of slightly larger dimensions than the top of fence post 12 such that base 19 of post cap 18 can be friction-fit about the top of fence post 12. Post cap 18 also provides an ornamental function, adding to the aesthetics of the fence. To this end, the fence owner may select a post cap 18 having a particular configuration and/or design, based upon the preferences of the fence owner.

SUMMARY

In accordance with the present disclosure, an apparatus for releasable mounting to a fence post and configured to display flowers, plants, or other items is provided. The apparatus includes a leg portion, a basket portion, and a mounting portion. The leg portion defines a first end and a second end. The basket portion is coupled to the leg portion at the first end of the leg portion and extends from the leg portion in a first direction. The mounting portion is coupled to the leg portion at the second end of the leg portion and extends from the leg portion in a second direction opposite the first direction. The mounting portion is configured for mounting about a fence post.

In embodiments, the apparatus is formed from PVC, vinyl, or any other suitable plastic or metal. Further, the apparatus may be formed from similar materials as the fence upon which the apparatus is to be mounted. Additionally or alternatively, the apparatus may be monolithically formed.

In embodiments, the basket portion includes a rear wall, a base wall, and a front wall that cooperate to define an interior. The basket portion may define any suitable configuration such as, for example, semi-ovular, rectangular, square, etc. The interior of the basket portion is configured to receive flowers, plants, etc. for display.

In embodiments, the mounting portion includes a body defining a recess configured to receive a top portion of a fence post, e.g., such that the mounting portion is mounted about the top portion of the fence post in friction-fit engagement. The mounting portion may further include a cap disposed on an opposite end of the body relative to the recess.

In embodiments, the apparatus is configured and dimensioned for use with standard size fence posts and/or post caps. For example, the standard size fence post may be a four inch by four inch square fence post.

In embodiments, the leg portion defines a cut-out that is configured to receive a portion of a protruding fence post. Additionally or alternatively, the basket portion may include a lip and the apparatus may be configured to receive a protruding top section of a fence panel between the lip of the basket portion and the mounting portion.

A fence system provided in accordance with the present disclosure includes a fence and an apparatus, e.g., similar to any of the embodiments above. The fence includes a fence post and first and second fence panels connected to the fence post. The fence system may further include a post cap configured for releasable mounting about the fence post.

BRIEF DESCRIPTION OF THE DRAWINGS

Aspects and features of the present disclosure are described herein with reference to the accompanying drawings, wherein.

DETAILED DESCRIPTION

Various embodiments of the present disclosure will now be described in detail with reference to the drawings, wherein like reference numerals identify similar or identical elements. In the following description, well known functions or constructions are not described in detail to avoid obscuring the present disclosure in unnecessary detail.

Turning now to FIGS. 1-5B, a fence post mountable apparatus provided in accordance with the present disclosure is shown generally identified by reference numeral 100. Apparatus 100 generally includes a basket portion 120 configured to retain flowers, plants, etc. for display, a mounting portion 140 for mounting apparatus 100 to fence post 12 of fence 10 (or any other standard fence post), and a leg portion 160 interconnecting basket portion 120 and mounting portion 140. Basket portion 120, mounting portion 140, and leg portion 160 may be monolithically formed as apparatus 100, or may be joined to one another in any other suitable fashion, e.g., via screws, bolts, snap-fit connections, adhesives, welding, etc. Apparatus 100 and/or any of the components thereof may be formed from suitable metals or plastics, e.g., PVC or vinyl. In particular, the material(s) forming apparatus 100 may be selected in accordance with the material(s) forming fence 10, to provide a more consistent look.

Basket portion 120 includes a rear wall 122, a base wall 124, and a front wall 126 that cooperate to define an interior area 128 configured to receive flowers, plants, or other items for display. Rear wall 122 defines a generally planar configuration and is configured to extend across fence post 12 and a portion of each adjacent fence panel 14, 16 of fence 10. Base wall 124 extends from rear wall 122 to enclose the bottom of interior area 128. Base wall 124 is configured to support the flowers, plants, etc. disposed within interior area 128. Front wall 126 is connected to rear wall 122 at each end thereof and is curved, bowed, and/or angled outwardly relative to rear wall 122 to define interior area 128 therebetween. Basket portion 120 may define any suitable configuration, e.g., semi-ovular, rectangular, square, etc., depending, for example, upon a desired look and/or configuration. Additionally or alternatively, separate interior areas 128, e.g., separated by one or more dividers (not shown), may also be provided. Further, front wall 126 may include a rim 127 including a particular design and/or feature, e.g., to match the design of fence 10.

Figure 1:
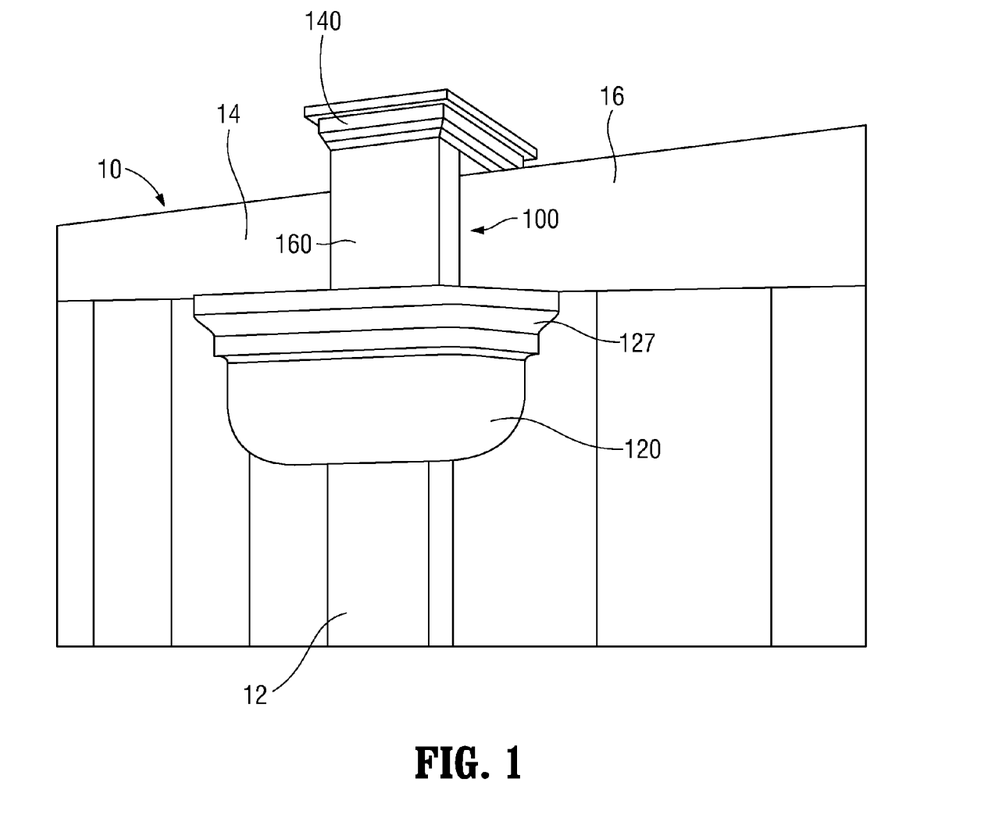
FIG. 1 is a perspective view of a fence post mountable apparatus provided in accordance with the present disclosure and shown mounted on a fence.

Mounting portion 140 of apparatus 100 includes a body 142 defining a recess 144 on an underside end thereof, and a cap 146 disposed on the opposite, or top end thereof. Cap 146 may define any suitable configuration. In particular, cap 146 may be configured similar to post cap 18 (FIG. 9) so as to provide a consistent look between those fence posts 12 having a post cap 18 mounted thereto (see FIG. 9) and those fence posts 12 having apparatus 100 mounted thereto. Recess 144 defined within body 142 is complementary to and of slightly larger dimensions than the top of fence post 12 such that the top of fence post 12 can be received within recess 144 to frictionally retain mounting portion 140 of apparatus 100 about the top of fence post 12. Thus, mounting portion 140 may be readily engaged and disengaged from about fence post 12 without the need for tools or additional materials, in a similar manner as the engagement and disengagement of a post cap 18 (FIG. 9) about fence post 12. For example, recess 144 may be configured and dimensioned to receive a standard-sized fence post 12, e.g., of 4 inches by 4 inches. However, other suitable configurations are also contemplated.

Figure 2:
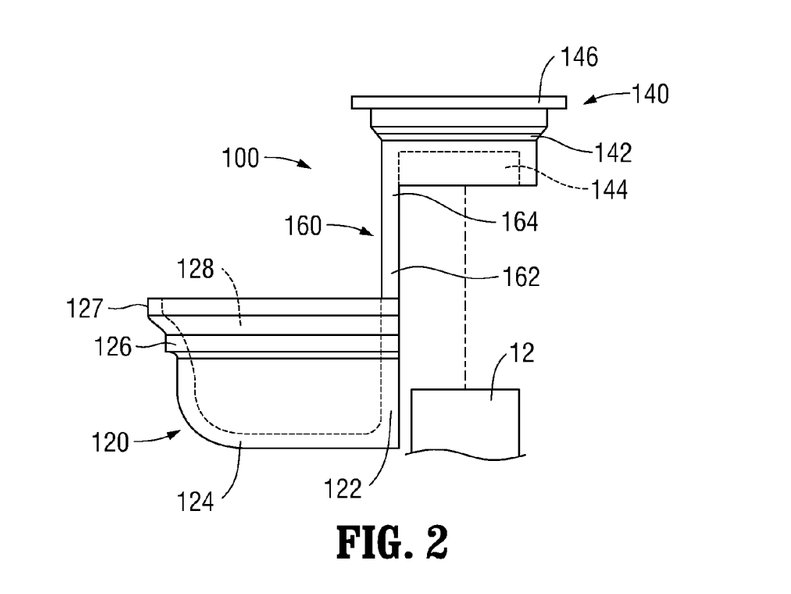
FIG. 2 is a side view of the apparatus of FIG. 1 being positioned about a fence post.
Figure 3:
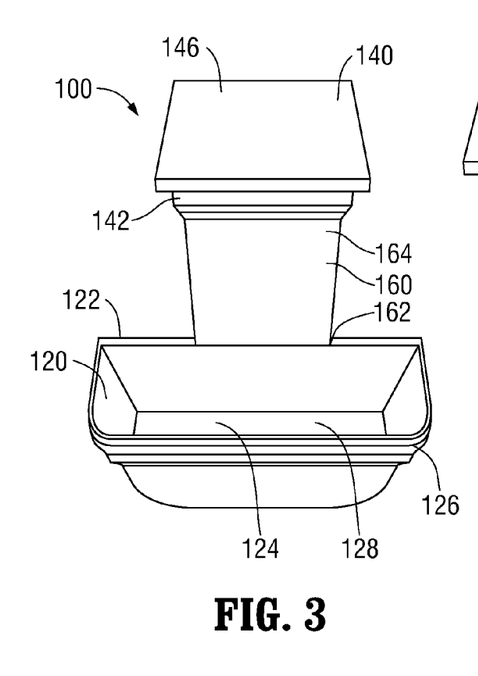
FIG. 3 is a front, perspective view of the apparatus of FIG. 1.
Figure 4:
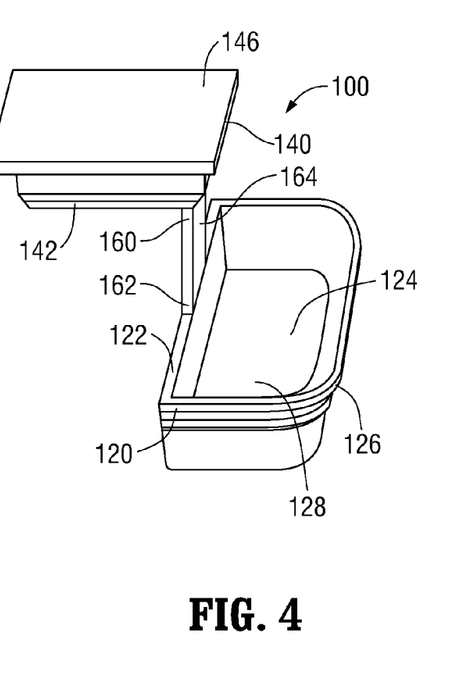
FIG. 4 is a side, perspective view of the apparatus of FIG. 1.
Figure 5A:
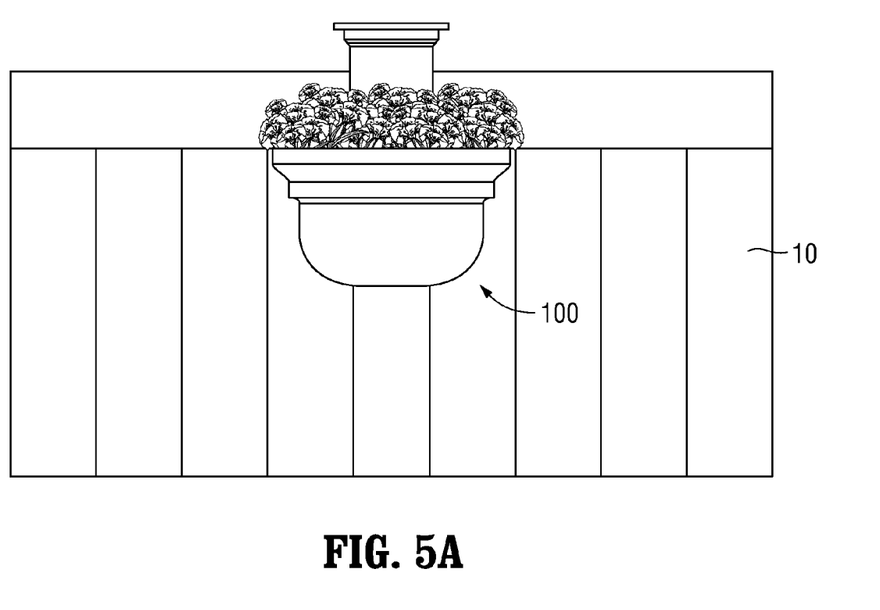
FIG. 5A is a front view of the apparatus of FIG. 1 shown mounted on the fence post and supporting flowers, plants, etc. for display.
Figure 5B:
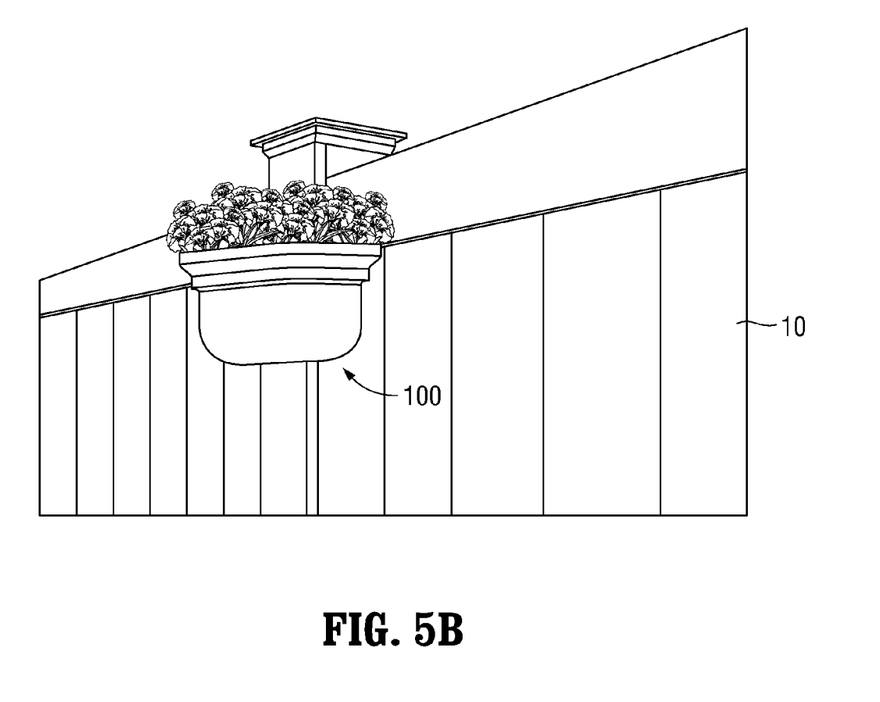
FIG. 5B is a perspective view of the apparatus of FIG. 1 shown mounted on the fence post and supporting flowers, plants, etc. for display.

Leg portion 160 of apparatus 100 is rigidly formed and, as mentioned above, interconnects basket portion 120 and mounting portion 140. More specifically, basket portion 120 is coupled to leg portion 160 at a first end 162 of leg portion 160 and extends therefrom in a first direction, while mounting portion 140 is coupled to leg portion 160 at a second end 164 of leg portion 160 and extends therefrom in a second, opposite direction (see FIG. 2). As a result of this configuration, mounting portion 140 is capable of being engaged about the top of fence post 12, while basket portion 120 is suspended from mounting portion 140 in abutment with fence 10. Leg portion 160 and rear wall 122 of basket portion 120 may be coplanar, as shown in FIG. 2, or may define any other suitable configuration. Further, the length of leg portion 160 may be selected in accordance with a desired height difference between mounting portion 140 and basket portion 120. Alternatively, leg portion 160 may be telescopically extendable/retractable and lockable to achieve a desired length.

As can be appreciated, the above-described configuration of apparatus 100 is advantageous at least in that, from one side of fence 10, only cap 146 of mounting portion 140 is visible, thus giving the appearance that fence 10 simply includes a post cap mounted thereon. However, on the other side of fence 10, basket member 120 is suspended, displaying the flowers, plants, or other items received therein.

Figure 6A:
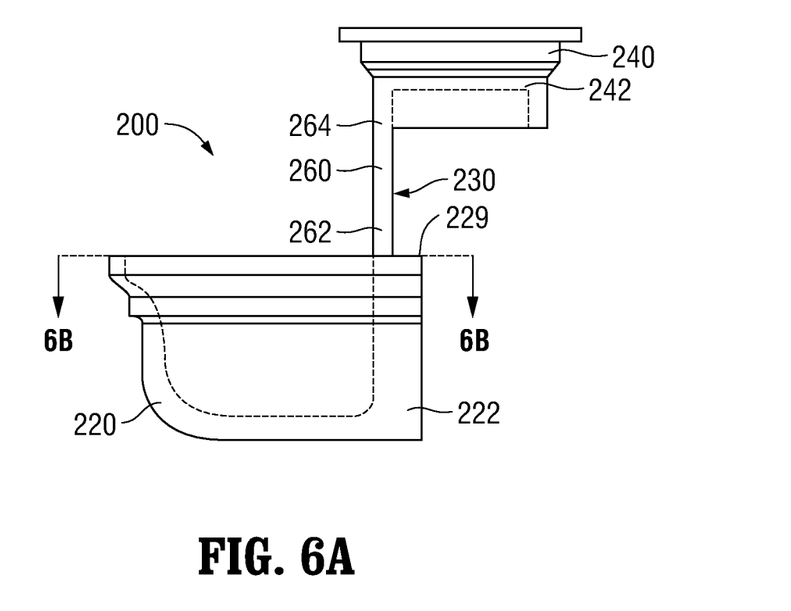
FIG. 6A is a side view of another fence post mountable apparatus provided in accordance with the present disclosure.
Figure 6B:
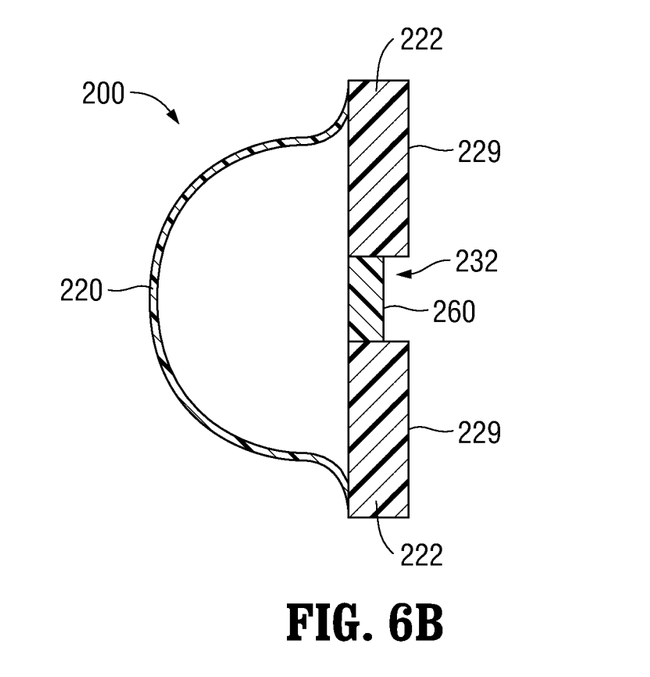
FIG. 6B is a cross-sectional view taken along section line "6B-6B" of FIG. 6A.

Turning to FIGS. 6A-6B, another embodiment of a fence post mountable apparatus provided in accordance with the present disclosure is shown generally identified by reference numeral 200. Apparatus 200 is similar to apparatus 100 (FIGS. 1-5B) and, thus, for purposes of brevity, only the differences therebetween will be described in detail below, while similarities will be summarily described or omitted entirely.

Apparatus 200 includes a basket portion 220, a mounting portion 240, and a leg portion 260 interconnecting basket portion 220 and mounting portion 240. As best shown in FIG. 6A, basket portion 220 generally extends from first end 262 of leg portion 260 in a first direction, while mounting portion 240 extends from second end 264 of leg portion 260 in a second, opposite direction. However, basket portion 220 also includes one or more lip members 229 that extend in the second direction from first end 262 of leg portion 260. That is, leg portion 260 and rear wall 222 of basket portion 220 are not coplanar but, rather, define substantially parallel surfaces that are offset via lip member(s) 229. Lip member(s) 229 and body 242 of mounting portion 240 cooperate to define a longitudinally-extending recess 230 extending along the length of leg portion 260. Recess 230 is configured to receive a protruding top section 15, 17 (FIGS. 9-10) of each fence panel 14, 16 (FIGS. 9-10), respectively, to provide additional retention and support to maintain the positioning of apparatus 200 relative to fence 10 (FIGS. 9-10) in embodiments where top sections 15, 17 (FIGS. 9-10) protrude relative to the remainder of fence panels 14, 16 (FIGS. 9-10), respectively.

As best shown in FIG. 6B, leg portion 260 of apparatus 200 may additionally or alternatively include a transversely-extending recessed portion or cut-out 232 defined between leg portion 260 and lip member(s) 229, or simply between leg portion 260 and rear wall 222 of basket portion 220 (in embodiments where lip member(s) 229 are not provided). Cut-out 232 is configured and dimensioned for receiving protruding fence post 12 (FIGS. 9-10). That is, in embodiments where fence post 12 (FIGS. 9-10) protrudes relative to fence panels 14, 16 (FIGS. 9-10), the protruding portion of fence post 12 (FIGS. 9-10) is received within cut-out 232 to provide additional retention and support to maintain the positioning of apparatus 200 relative to fence 10 (FIGS. 9-10).

Figure 7:
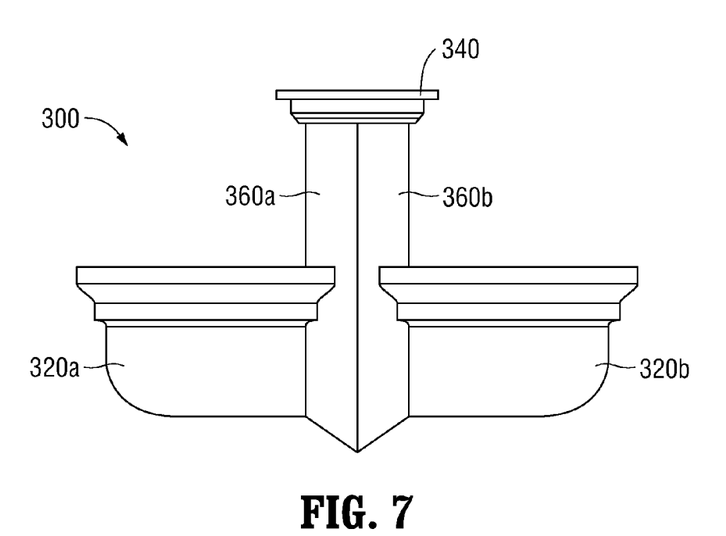
FIG. 7 is a side view of another fence post mountable apparatus provided in accordance with the present disclosure.

FIG. 7 illustrates another embodiment of a fence post mountable apparatus provided in accordance with the present disclosure, shown generally identified by reference numeral 300. Apparatus 300 is similar to apparatus 100 (FIGS. 1-5B) and may include any of the features of apparatus 100 (FIGS. 1-5B). Accordingly, for purposes of brevity, only the differences therebetween will be described in detail below, while similarities will be summarily described or omitted entirely.

Apparatus 300 is configured as a corner post mountable apparatus and generally includes first and second basket portions 320a, 320b; first and second leg portions 360a, 360b; and a mounting portion 340. Leg portions 360a, 360b are positioned in side-by-side relation relative to one another and are joined along the lengths thereof. Further, leg portions 360a, 360b are disposed in perpendicular orientation relative to one another. Each leg portion 360a, 360b including a respective basket portion 320a, 320b at a first end thereof and is attached to mounting portion 340 at a second end thereof. Basket portions 320a, 320b may define reduced dimensions so as not to interfere with one another, or may be joined within one another to define a single interior for receiving flowers, plants, etc.

Mounting portion 340, similarly as detailed above with respect to previous embodiments, is configured for mounting about the top of a fence post, e.g., similar to fence post 12 (FIGS. 9-10). However, apparatus 300 is specifically configured, as a result of the orientation of leg portions 360a, 360b, for mounting on the exterior side of a corner fence post (not shown), such that leg portions 360a, 360b and basket portions 320a, 320b extend along adjacent perpendicular faces of the corner fence post (not shown). Alternatively, apparatus 300 may be configured for mounting on an interior side of a corner fence post (not shown), in similar fashion.

Figure 8A:
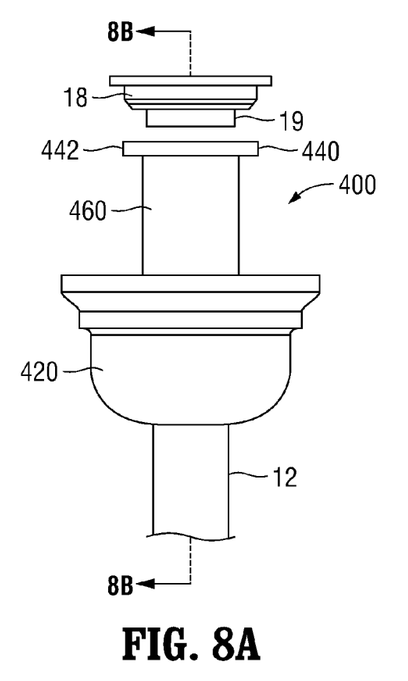
FIG. 8A is a front view of another fence post mountable apparatus provided in accordance with the present disclosure and shown mounted on a fence post with the post cap removed therefrom.
Figure 8B:
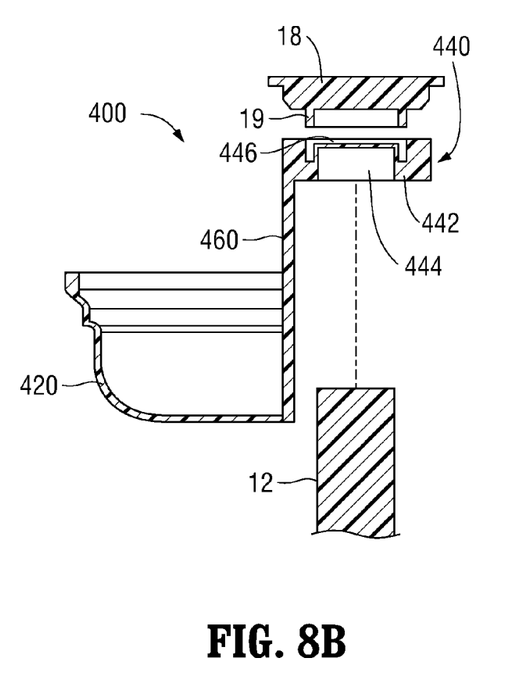
FIG. 8B is a cross-sectional view taken along section line "8B-8B" of FIG. 8A.

Turning to FIGS. 8A-8B, another embodiment of a fence post mountable apparatus provided in accordance with the present disclosure is shown generally identified by reference numeral 400. Apparatus 400 is similar to apparatus 400 (FIGS. 1-5B) and, thus, for purposes of brevity, only the differences therebetween will be described in detail below, while similarities will be summarily described or omitted entirely.

Apparatus 400 includes a basket portion 420, a mounting portion 440, and a leg portion 460 interconnecting basket portion 420 and mounting portion 440. Mounting portion 440 includes a body 442 defining a first recess 444 on an underside end thereof, and a second recess 446 on the opposite, or top end thereof. Recess 444, similarly as detailed above with respect to previous embodiments, is configured to receive and frictionally retain the top of fence post 12 therein. Recess 446, on the other hand, is configured to receive base 19 of post cap 18. That is, rather than providing a cap affixed to the mounting portion, as detailed above with respect to apparatus 100 (FIGS. 1-5B), apparatus 400 is configured to releasably receive a post cap 18. As a result of this configuration, apparatus 400 need not be selected based upon the configuration of its cap but, rather, apparatus 400 may be utilized with the post cap 18 previously mounted about the fence post 12, or any other suitable post cap.

It will be understood that various modifications may be made to the embodiments of the present disclosure. Therefore, the above description should not be construed as limiting, but merely as exemplifications of embodiments. Those skilled in the art will envision other modifications within the scope and spirit of the present disclosure.

What is claimed is:
1. A fence system, comprising:
   a fence, including:
      a fence post including four sides arranged to define a square cross-sectional configuration, the fence post defining a free upper end; and
      first and second fence panels connected to the fence post; and
   an apparatus configured for releasable mounting on the fence post, the apparatus including:
      a rigid leg portion defining a first end and a second end and configured to extend along the fence post in parallel orientation relative to one of the sides of the fence post when the apparatus is mounted on the fence post;
      a rigid basket portion rigidly coupled to the leg portion at the first end of the leg portion and extending perpendicularly from the leg portion in a first direction; and
      a rigid mounting portion rigidly coupled to the leg portion at the second end of the leg portion and extending perpendicularly from the leg portion in a second direction opposite the first direction, the mounting portion including a body defining a recess configured to receive a portion of the free upper end of the fence post to releasably mount the apparatus about the fence post.

2. The system according to claim 1, wherein the fence and the apparatus are formed from the same material.

3. The system according to claim 1, wherein the basket portion of the apparatus includes a rear wall, a base wall, and a front wall that cooperate to define an interior, the interior configured to receive at least one of flowers and plants.

4. The system according to claim 1, wherein the mounting portion of the apparatus includes a cap disposed on an opposite end of the body relative to the recess.

5. The system according to claim 1, further comprising a post cap configured for releasable mounting about the fence post in the absence of the apparatus mounted thereto.

6. The system according to claim 5, wherein the post cap and the fence post define standard configurations and dimensions.

7. The system according to claim 1, wherein a portion of the fence post protrudes from the fence panels and wherein the leg portion of the apparatus defines a transversely-extending cut-out configured to receive the protruding portion of the fence post.

8. The system according to claim 1, wherein at least one of the first and second fence panels includes a top section that protrudes therefrom, and wherein the basket portion of the apparatus includes a lip extending in the second direction from the leg portion, the lip cooperating with the mounting portion to define a recess configured to receive the protruding top section.

9. The system according to claim 5, wherein the mounting portion of the apparatus is similar to the post cap so as to be indistinguishable as viewed from one side of the fence.

10. The system according to claim 1, wherein the basket portion, the mounting portion, and the leg portion of the apparatus are monolithically formed as a single component.

* * * * *